Jan. 14, 1941. D. H. ANNIN 2,228,336
AUTOMATIC RESET MECHANISM
Filed Oct. 30, 1936
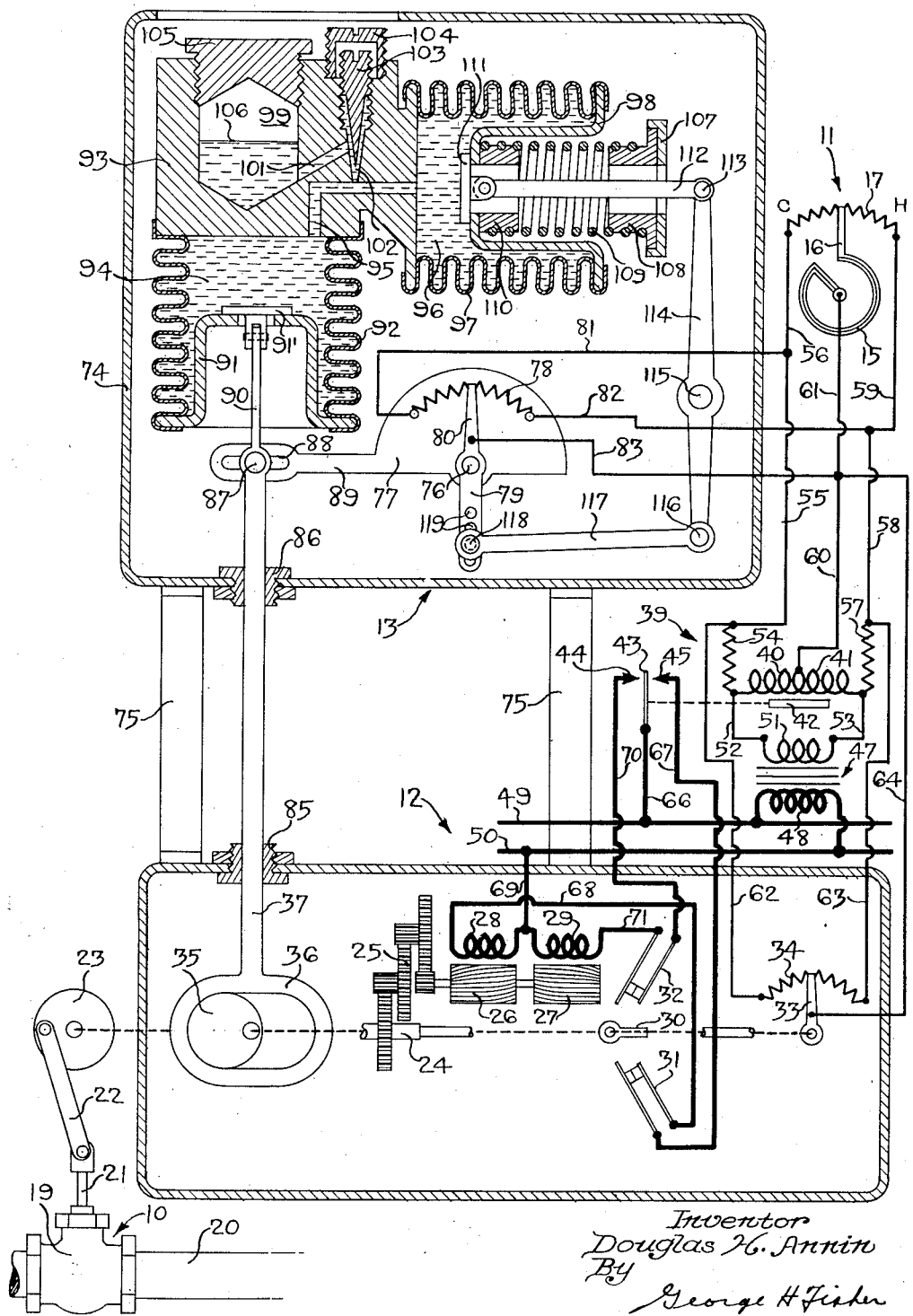
Inventor
Douglas H. Annin
By
George H Fisher
Attorney Patented Jan. 14, 1941

2,228,336

UNITED STATES PATENT OFFICE 2,228,336

AUTOMATIC RESET MECHANISM

Douglas H. Annin, Chicago, Ill., assignor to Minneapolis-Honeywell Regulator Company, Minneapolis, Minn., a corporation of Delaware Application October 30, 1936, Serial No. 108,459

14 Claims. (Cl. 236—78)

This invention relates to automatic reset or load compensation mechanism in general and more particularly to that type of mechanism as applied to a follow up control system.

An object of this invention is to provide a new and novel reset or load compensation mechanism.

Another object of this invention is to provide a reset mechanism in combination with a follow up control system which positions a device in accordance with the value of a condition to be controlled wherein the reset mechanism is operated by the device which is to be positioned, to additionally position the device whereby the condition to be controlled is maintained within closer limits.

Still another object of this invention is to provide a reset mechanism which can be used in connection with an electrically balanced proportioning system to maintain substantially constant conditions regardless of changes in load, wherein the reset mechanism operates a variable resistance means which compensates the electrical proportioning control system to accomplish the desired results.

Other objects and advantages will become apparent to those skilled in the art upon reference to the accompanying specification, claims and drawing.

For a more thorough understanding of this invention reference is made to the accompanying single sheet of drawings wherein 10 generally designates a device which is adapted to be positioned in a plurality of positions to control a condition. A condition responsive device, the state of which is varied in accordance with changes in the value of the condition to be controlled, is generally designated at 11. A proportioning motor for operating the device to a plurality of positions is generally designated at 12, and the reset mechanism which compensates for changes in load is generally designated at 13.

Although my invention is applicable to the control of any desired condition, for purposes of illustration I have shown it as controlling a temperature condition such as the temperature of a space, not shown. Therefore, the condition responsive device generally designated at 11 is shown to comprise a space thermostat having a bimetallic element 15 for operating a slider 16 with respect to a potentiometer resistance coil 17. The arrangement is such that upon a decrease in space temperature, the slider 16 is moved towards the left in the direction indicated by the character C, and upon an increase in temperature it is moved towards the right in the direction indicated by the character H. For a desired normal temperature value the slider 16 assumes a position midway between the ends of the potentiometer coil 17, and this designates the normal desired position or adjustment of the control potentiometer.

The device generally designated at 10, which is positioned in a plurality of positions to control the value of the condition, is shown to comprise a valve 19 for controlling the supply of heating fluid through a conduit 20 for heating the space in any known manner. The valve 19 is operated by a valve stem 21 which is connected by a pitman 22 to a crank disc 23 mounted on a shaft 24, which in turn is operated by the proportioning motor generally designated at 12.

The shaft 24 may be operated through a reduction gear train 25 by means of rotors 26 and 27. The rotors 26 and 27 are operated by field windings 28 and 29, the arrangement being such that when the field winding 28 is energized the valve 19 is moved towards an open position and when the field winding 29 is energized the valve 19 is moved towards a closed position. The shaft 24 also operates an abutment member 30 which is adapted to open limit switches 31 and 32 when the valve 19 is moved to either an extreme closed position or an extreme open position. The shaft 24 also operates a slider 33 with respect to a balancing potentiometer coil 34, the arrangement being such that when the valve 19 is moved towards an open position the slider 33 is moved towards the right with respect to the coil 34 and when the valve 19 is moved towards a closed position the slider 33 is moved towards the left with respect to the coil 34. The shaft 24 also operates a cam or an eccentric 35 which in turn operates a follower 36 carried by a stem 37. The stem 37, as will be pointed out more fully hereafter, operates the automatic reset or load compensation mechanism generally designated at 13.

The proportioning motor 12 is controlled by means of a normally balanced relay generally designated at 39, and this relay may comprise series connected coils 40 and 41 which influence an armature 42. The armature 42 is suitably connected to a switch arm 43 which is adapted to engage either a contact 44 or a contact 45. The arrangement is such that when the relay coil 41 is energized more than the relay coil 40 the switch arm 43 is moved into engagement with the contact 45 and when the relay coil 40 is energized more than the relay coil 41 the switch arm 43 is moved into engagement with the contact 44. When the relay coils 40 and 41 are equally energized the switch arm 43 is maintained in a midposition spaced from the contacts 44 and 45.

Power is supplied to the normally balanced relay 39 by means of a step-down transformer generally designated at 47. Transformer 47 comprises a primary 48 connected across line wires 49 and 50 and a secondary 51. The left-hand end of the secondary 51 is connected by a wire 52 to the left-hand end of the relay coil 40, and in a like manner the right-hand end of the secondary 51 is connected by a wire 53 to the right-hand end of the relay coil 41. The adjacent ends of the relay coils 40 and 41 are connected together. From this it is seen that the series connected coils 40 and 41 are connected across the secondary 51.

The left-hand end of the relay coil 40 is connected by a protective resistance 54 and wires 55 and 56 to the left-hand end of the control potentiometer coil 17. The right-hand end of the relay coil 41 is connected by a protective resistance 57 and wires 58 and 59 to the right-hand end of the control potentiometer coil 17. The junction of the coils 40 and 41 is connected by wires 60 and 61 and bimetallic element 15 to the slider 16 of the control potentiometer. The left-hand end of the balancing potentiometer coil 34 is connected by a wire 62 to the protective resistance 54 and the right-hand end of the balancing potentiometer coil 34 is connected by a wire 63 to the protective resistance 57. The slider 33 of the balancing potentiometer is connected by a wire 64 to the junction of wires 60 and 61. From the above wiring connections it is seen that the control potentiometer and the balancing potentiometer are connected in parallel with the series connected coils 40 and 41.

Omitting for the time being the operation of the reset or load compensation mechanism 13, it is seen that the slider 16 of the control potentiometer is in the mid or normal desired position, the slider 33 of the balancing potentiometer is in the midposition and therefore the relay coils 40 and 41 are equally energized. The switch arm 43 is therefore in a midposition with respect to the contacts 44 and 45 and consequently the proportioning motor 12 is stationary and the valve 19 is in a midposition. Under these conditions the correct amount of heat is being supplied to the space to just make up for the heat losses and therefore the system is in a stable condition. If the temperature to be controlled decreases the slider 16 is moved towards the left with respect to its resistance 17 and by reason of the parallel relationship pointed out above the relay coil 40 is partially short-circuited to decrease the energization thereof and increase the energization of the relay coil 41. This unbalanced condition of the series connected relay coils 40 and 41 causes movement of the switch arm 43 into engagement with the contact 45 to complete a circuit from the line wire 49 through wire 66, switch arm 43, contact 45, wire 67, limit switch 31, wire 68, field winding 28 and wire 69 back to the other line wire 50. Completion of this circuit causes energization of the field winding 28 to move the valve 19 towards an open position to supply an additional amount of heat to the space. Movement of the valve 19 towards an open position causes right-hand movement of the slider 33 with respect to its resistance 34. By reason of the parallel relationship pointed out above, this right-hand movement causes partial short-circuiting of the relay coil 41 to decrease the energization thereof and increase the energization of relay coil 40. When the slider 33 has moved sufficiently far to the right to rebalance the energizations of the relay coils 40 and 41 the switch arm 43 is moved out of engagement with the contact 45 to stop operation of the proportioning motor 12 and to maintain the valve 19 in its newly adjusted position.

Upon an increase in temperature affecting the controller 11 the slider 16 is moved towards the right with respect to the control resistance 17 in the direction indicated by the character H. This right-hand movement causes partial short-circuiting of the relay coil 41 to decrease the energization thereof and to increase the energization of relay coil 40. This unbalanced condition causes movement of the switch arm 43 into engagement with the contact 44 to complete a circuit from the line wire 49 through wire 66, switch arm 43, contact 44, wire 70, limit switch 32, wire 71, field winding 29 and wire 69 back to the other line wire 50. Completion of this circuit causes energization of the field winding 29 to move the valve 19 towards a closed position. Movement of the valve 19 towards a closed position causes left-hand movement of the slider 33 with respect to the balancing potentiometer 34. This left-hand movement of the slider 33 in turn causes partial short-circuiting of the relay coil 40 to decrease the energization thereof and to increase the energization of the relay coil 41. When the slider 33 has moved sufficiently far to the left to rebalance the energization of the relay coils 40 and 41, the switch arm 43 is moved out of engagement with the contact 44 to stop further operation of the proportioning motor 12 and to maintain the valve 19 in its newly adjusted position.

In this manner the valve 19 is modulated towards an open position upon a decrease in temperature and is modulated towards a closed position upon an increase in temperature and the amount of movement of valve 19 in either direction is dependent upon the amount that the temperature to be controlled deviates from the desired normal value. If the valve 19 is moved to either an extreme open position or an extreme closed postion the limit switches 31 and 32 are opened to prevent overtravel of the proportioning motor 12.

By reason of the above follow up or modulating control system the value of the temperature to be controlled is maintained within predetermined limits depending upon the range of operation of the controller generally designated at 11. If the range of operation of the controller 11 is decreased so as to maitnain the temperature within closer limits "hunting" of the control system is likely to occur. On the other hand, if the range is increased sufficiently far to prevent "hunting" the temperature controlled thereby may not be maintained within sufficiently close limits and "drooping" of the condition to be controlled may be caused by changes in the load. Provision must therefore be made for maintaining the temperature to be controlled within predetermined narrow limits and still prevent appreciable "hunting." By reason of this invention the temperature to be controlled is not only maintained within predetermined narrower limits but the temperature is maintained substantially constant at the desired normal value regardless of changes in the load. This is accomplished by means of the automatic reset or load compensation mechanism generally designated at 13.

This reset mechanism may comprise a casing 74 to which is suitably secured a stationary pivot pin 76. Upon the pivot pin 76 is pivotally mounted a segment 77 which carries a compensating potentiometer resistance coil 78. Also pivotally mounted on the pivot pin 76 is a lever 79 carrying a slider 80 which is adapted to slide across the potentiometer resistance 78. The left-hand end of the compensating potentiometer coil 78 is connected by a wire 81 to the junction of wires 55 and 56 and the right-hand end thereof is connected by a wire 82 to the junction of wires 58 and 59. The slider 80 is connected by a wire 83 to the junction of wires 60 and 61. From these wiring connections it is seen that the compensating potentiometer of the reset mechanism 13 is also connected in parallel with the control potentiometer, the balancing potentiometer and the series connected coils.

The stem 37 which is operated by the cam 35 extends through guides 85 and 86 into the housing 74 of the reset mechanism 13. The stem 37 carries a pin 87 which is adapted to engage in a slot 88 of an extension 89 formed on the segment 77, and by reason of this arrangement when the valve 19 is moved towards an open position the segment 77 is rotated in a clockwise direction and when the valve 19 is moved towards a closed position the segment 77 is rotated in a counterclockwise direction. The stem 37 has an extension 90 which is secured to a member 91' which in turn is suitably secured as by soldering to a movable end plate 91. Secured to the movable end plate 91 is one end of a bellows 92, the other end of which is suitably secured to a block 93 to form an enclosed expansible chamber 94. The chamber 94 is connected by a free passage 95 formed in the block 93 to an enclosed expansible chamber 96, which chamber is formed by a bellows 97 one end of which is suitably secured to the block 93 and the other end suitably secured to a closure plate 98. The block 93 also contains a reservoir chamber 99 which is connected by a passage 101 and a restricted passage 102 to the passage 95. A needle valve 103 controls the flow of fluid through the passage 102 and by suitably adjusting the needle valve 103 the amount of restriction in the passage 102 may be varied at will. To prevent haphazard tapering with the needle valve 103 it is enclosed by means of a cap 104. The reservoir chamber 99 may, if desired, be closed by a plug 105. The chambers 94 and 96, their communicating passage 95, and passages 101 and 102, are completely filled with a substantially inelastic liquid and this liquid extends into the reservoir chamber 99 to a level indicated by the character 106.

Suitably secured to the housing 74 is a bracket 107 which supports a spring retainer 108 upon which is mounted one end of a combined tension and compression spring 109. The other end of the spring 109 is connected to a spring anchor member 110 which is suitably secured to the closure 98. A member 111 which seals the chamber 96, is connected to one end of a link 112. The other end of the link 112 is connected to one end of a pivoted lever 114 as at 113. The lever 114 is pivoted upon a stationary pivot pin 115. At 116 a lever 117 is pivoted to the lever 114 and this lever 117 carries a pivot pin 118 which is adapted to engage in one of a plurality of holes 119 located in the lever 79.

With the parts in the position shown in the drawing the spring 109 is in a neutral condition, that is, it is in neither tension or compression, and therefore the slider 80 of the compensating potentiometer is in a vertical position. With the proportioning control system in the position shown in the drawing the valve 19 is in a midposition and therefore the segment 77 carrying the compensating potentiometer coil 78 is in a midposition. Assume now that the load on the heating system increases. This increase in load causes a decrease in temperature with consequent movement of the slider 16 towards the left with respect to its potentiometer coil 17 in the direction indicated by the character C. As pointed out above, this causes movement of the valve 19 towards an open position. Movement of the valve 19 towards an open position causes upward movement of the stem 37 to rotate the segment 77 in a clockwise direction. Upward movement of the stem 37 also decreases the volume of the chamber 94, forcing liquid therefrom into the chamber 96, this liquid being prevented momentarily from going into the receiver chamber 99 by reason of the restricted passage 102. Forcing of liquid from the chamber 94 into the chamber 96 causes right-hand movement of the closure member 98. This right-hand movement causes compression of the spring 109 and clockwise movement of the pivoted lever 114. This clockwise movement of the pivoted lever 114 also causes clockwise movement of the slider 80. If the pin 118 is in the correct opening 119, and such case is assumed, the slider 80 is moved in the same direction and at substantially the same rate as the segment 77. Therefore, the slider 80 is maintained in the midposition with respect to the compensating potentiometer coil 78 so that the compensating potentiometer at this point has no effect whatsoever upon the electrical balance of the proportioning control system. The valve 19 is moved towards an open position in accordance with the amount that the slider 16 has moved from its desired normal position.

However, the spring 109 which was placed under compression by the opening movement of the valve 19, forces liquid from the chamber 96 into the reservoir chamber 99 since this liquid cannot be forced back into the chamber 94, the volume of the chamber 94 being fixed by the position of the valve. The flow of liquid from the chamber 96 into the reservoir chamber 99 is restricted or retarded, and therefore the spring gradually moves the closure member 98 towards the left to the normal position and when the compression within the spring 109 has reached a zero point the closure member 98 will be in the normal position. Expansion of the spring 109 in this manner also causes counter-clockwise movement of the slider 80 towards the vertical position and when the compression in the spring 109 reaches a zero value the slider 80 will be returned to the vertical position. However, the resistance coil 78 is maintained in the clockwise position and this counter-clockwise movement of the slider 80 towards the left with respect to the compensating potentiometer coil 78 causes partial short-circuiting of the relay coil 40 to decrease the energization thereof and increase the energization of the relay coil 41. This causes movement of the switch arm 43 into engagement with the contact 45 to move the valve 19 further towards an open position. If the needle valve is so adjusted that the rate at which the slider 80 is returned to the normal vertical position is equal to the rate at which the heating system recovers, the slider 16 of the control potentiometer will return to the mid-position with respect to its potentiometer coil 17 at the same time that the slider 80 of the reset mechanism returns to its vertical position. In this manner the valve 19 is moved additionally towards as open position to restore the value of the temperature to be controlled to a normal value whereupon the slider 16 of the control potentiometer is returned to its desired normal position. The needle valve 103 may be adjusted so that the rate of additional opening of the valve may correspond to the rate at which the heating system recovers following a change in load condition and if a proper adjustment is made, the valve 19 will assume a new position that will supply just the correct amount of heat to maintain the temperature constant regardless of the increase in heating load.

Conversely, upon a decrease in load conditions the temperature to be controlled increases and the slider 16 is moved towards the right in the direction indicated by the character H. This causes movement of the valve 19 towards a closed position to decrease the supply of heat. Movement of the valve 19 towards a closed position causes downward movement of the stem 37 and consequent counter-clockwise movement of the segment 77 and the compensating potentiometer coil 78. Downward movement of the stem 37 always increases the volume of the chamber 94 which withdraws liquid from the chamber 96 to decrease the volume of the chamber 96 by moving the closure 98 towards the left. Movement of the closure 98 towards the left places the spring 109 in tension and causes counter-clockwise movement of the lever 114 and the slider 80. The slider 80 moves at substantially the same rate as the segment 77 and therefore the compensating potentiometer has substantially no effect upon the electrically balanced proportioning system and the valve 19 is moved towards a closed position in an amount corresponding to the deviation of the condition from the desired normal value. However, the spring 109 which was placed in tension upon movement of the valve 19 towards a closed position urges the closure 98 towards the right to enlarge the chamber 96. This causes the withdrawal of liquid from the reservoir 99 through the restricted passage 102, and the rate of withdrawal of liquid from the reservoir chamber 99 is determined by the amount of restriction in the passage 102. When the tension in the spring 109 has decreased to a zero value the slider 80 of the compensating potentiometer is moved to the midposition, but the resistance element associated therewith remains in the counter-clockwise position. This movement of the slider 80 to the right with respect to the compensating potentiometer coil 78 causes partial short-circuiting of the relay coil 41 to decrease the energization thereof and to increase the energization of the relay coil 40. This causes additional movement of the valve towards a closed position to decrease the supply of heat in accordance with the decrease in load. If the needle valve 103 is properly adjusted the rate at which the slider 80 is returned to the vertical position corresponds with the rate at which the heating system recovers due to a decrease in the load, and when the slider 80 arrives at the vertical position the slider 16 of the control potentiometer should arrive at the same time at its normal desired position.

From the above it is seen that when the condition or temperature to be controlled deviates from the desired normal value, the valve 19 which controls the condition or the temperature to be controlled is moved a corresponding amount by the electrically balanced proportioning system and is moved an additional amount in either direction by the automatic reset or load compensation mechanism to compensate for changes in the load conditions. The rate at which the valve 19 is additionally moved may be adjusted by suitably manipulating the needle valve 103 so that the condition to be controlled will be restored to the desired normal value without any substantial "hunting." It should be noted at this point that the further the condition to be controlled deviates from normal the greater is the tension or compression placed in the spring 109. Therefore, the liquid is forced through the restricted passage 102 at a faster rate and the rate of reset is therefore greater when the condition to be controlled has deviated a greater amount from the desired normal value. Stated in another way, the rate of reset is varied in accordance with the amount of deviation of the condition to be controlled from the desired normal value.

The above operation is predicated on the location of the pivot pin 118 a given distance from the stationary pivot pin 76, whereby the slider 80 and the resistance element 78 are moved at substantially the same rate upon initial operation of the proportioning motor 12 caused by a deviation of the condition to be controlled from the desired normal value. If it be desired to provide an initial compensating effect immediately upon deviation of the condition to be controlled from the desired normal value, the pin 118 may be located in a hole 119 more remote from the pivot pin 76, whereupon the slider 80 will move at a slower rate and to a less extent than the compensating potentiometer coil 78. In this respect, if the valve 19 is moved towards an open position upon a decrease in temperature the compensating potentiometer will immediately partially short-circuit relay coil 40 to cause an immediate and additional movement of the valve 19 towards an open position. In a like manner, upon an increase in the temperature to be controlled which moves the valve 19 towards a closed position, compensating potentiometer will immediately partially short-circuit the relay coil 41 to immediately and additionally move the valve 19 towards a closed position. In this manner an initial effect is obtained which immediately counteracts the change in load conditions.

If, on the other hand, a negative initial effect is desired the pin 118 may be located in a hole 119 more closely to the pivot pin 76, and therefore a reverse action may be accomplished to decrease the immediate amount of opening upon a decrease in the temperature to be controlled, and to decrease the immediate amount of closing upon an increase in the temperature to be controlled. This may prove beneficial in cases where the changes in the load are not permanent but are temporary in character.

Although for purposes of illustration I have shown one form of my invention, other forms thereof may become obvious to those skilled in the art and therefore this invention is to be limited only by the scope of the appended claims and the prior art.

I claim as my invention:

1. A reset mechanism comprising in combination, a control member, a control element cooperable with said control member movable with respect thereto for performing a control function, means for biasing said control element to a given position, means for moving said control member and thereby causing simultaneous movement of said control element so that the positions of said two elements in respect to each other remain unchanged, and means included in said last mentioned means for allowing return movement of said control element to the given position by said biasing means whereby the positions of said two elements in respect to each other are changed to perform a control function.

2. A reset mechanism comprising in combination, a control member, a control element cooperable with said control member movable with respect thereto for performing a control function, means for biasing said control element to a given position, means for moving said control member and thereby causing simultaneous movement of said control element so that the positions of said two elements in respect to each other remain unchanged, means included in said last mentioned means for allowing return movement of said control element to the given position by said biasing means whereby the positions of said two elements in respect to each other are changed to perform a control function, and means for varying the rate at which said control element is returned to the given position by said biasing means.

3. In combination, a device to be positioned in a plurality of positions to control the value of a condition, control means the state of which is varied in accordance with changes in the value of the condition being controlled and having a desired normal state corresponding to a desired normal value of the condition, means controlled by said control means and including follow-up means operated by the device to position said device in accordance with changes in the state of the control means whereby the value of the condition being controlled is maintained within certain limits, and means including time delay means operated by said device following deviation of the condition being controlled from its desired normal value additionally to position said device with respect to the state of the control means for returning the value of the condition being controlled toward the desired normal value, the rate of additional positioning of the device being controlled by the time delay means and being a function of the amount of deviation of the condition being controlled from the desired value.

4. In combination, a device to be positioned in a plurality of positions to control the value of a condition, control means the state of which is varied in accordance with changes in the value of the condition being controlled and having a desired normal state corresponding to a desired normal value of the condition, means controlled by said control means and including follow-up means operated by the device to position said device in accordance with changes in the state of the control means whereby the value of the condition being controlled is maintained within certain limits, means including time delay means operated by said device following deviation of the condition being controlled from its desired normal value additionally to position said device with respect to the state of the control means for returning the value of the condition being controlled toward the desired normal value, and means for adjusting the time delay means to regulate the rate of additional positioning of the device.

5. In combination, a device to be positioned in a plurality of positions to control the value of a condition, control means the state of which is varied in accordance with changes in the value of the condition being controlled and having a desired normal state corresponding to a desired normal value of the condition, means controlled by said control means and including follow-up means operated by the device to position said device in accordance with changes in the state of the control means whereby the value of the condition being controlled is maintained within certain limits, and means operated by said device following deviation of the condition being controlled from its desired normal value additionally to position said device with respect to the state of the control means for returning the value of the condition being controlled toward the desired normal value, said last mentioned means including mechanism which additionally positions said device, a hydraulic connection between said device and said mechanism and spring biasng means for said connection.

6. In combination, a device to be positioned in a plurality of positions to control the value of a condition, control means the state of which is varied in accordance with changes in the value of the condition being controlled and having a desired normal state corresponding to a desired normal value of the condition, means controlled by said control means and including follow-up means operated by the device to position said device in accordance with changes in the state of the control means whereby the value of the condition being controlled is maintained within certain limits, and means operated by said device following deviation of the condition being controlled from its desired normal value additionally to position said device with respect to the state of the control means for returning the value of the condition being controlled toward the desired normal value, said last mentioned means including mechanism which additionally positions said device, means for biasing said mechanism to a desired position and hydraulic means operated by said device for moving said mechanism out of the desired position but allowing the biasing means to move gradually said mechanism to the desired position for additionally positioning gradually said device.

7. In combination, a device to be positioned in a plurality of positions to control the value of a condition, control means the state of which is varied in accordance with changes in the value of the condition being controlled and having a desired normal state corresponding to a desired normal value of the condition, means controlled by said control means and including follow-up means operated by the device to position said device in accordance with changes in the state of the control means whereby the value of the condition being controlled is maintained within certain limits, and means operated by said device following deviation of the condition being controlled from its desired normal value additionally to position said device with respect to the state of the control means for returning the value of the condition being controlled toward the desired normal value, said last mentioned means including mechanism which additionally positions said device, means for biasing said mechanism to a desired position, hydraulic means operated by said device for moving said mechanism out of the desired position but allowing the biasing means to move gradually said mechanism to the desired position for additionally positioning gradually said device and means for adjusting the hydraulic means to adjust the rate at which the biasing means moves said mechanism to the desired position whereby the rate of additional gradual positioning of said device may be adjusted.

8. In combination, a device to be positioned in a plurality of positions to control the value of a condition, control means the state of which is varied in accordance with changes in the value of the condition being controlled and having a desired normal state corresponding to a desired normal value of the condition, means controlled by said control means and including follow-up means operated by the device to position said device in accordance with changes in the state of the control means whereby the value of the condition being controlled is maintained within certain limits, and means operated by said device following deviation of the condition being controlled from its desired normal value additionally to position said device with respect to the state of the control means for returning the value of the condition being controlled toward the desired normal value, said last mentioned means including mechanism which additionally positions said device, means for biasing said mechanism to a given position, intercommunicating expansible chambers, one of said chambers being connected to said mechanism and the other being connected to said device, a reservoir chamber having restricted communication with said expansible chambers and a liquid completely filling said expansible chambers and partially filling said reservoir chamber.

9. In combination, an electrically operated device to be positioned in a plurality of positions for controlling the value of a condition, electrical resistance means varied in accordance with changes in the value of the condition being controlled and having a desired resistance value corresponding to a desired normal value of the condition, means controlled by variations in the resistance value of the resistance means and including follow-up means operated by the device for positioning said device in accordance with changes in the resistance value of the resistance means whereby the value of the condition being controlled is maintained within desired limits, and means including time delay means operated by said device following deviation of the condition being controlled from its desired normal value additionally to position said device with respect to the resistance value of the resistance means for returning the value of the condition being controlled toward the desired normal value, the rate of additional positioning of the device being controlled by the time delay means and being a function of the amount of deviation of the condition being controlled from the desired value.

10. In combination, an electrically operated device to be positioned in a plurality of positions for controlling the value of a condition, electrical resistance means varied in accordance with changes in the value of the condition being controlled and having a desired resistance value corresponding to a desired normal value of the condition, means controlled by variations in the resistance value of the resistance means and including follow-up means operated by the device for positioning said device in accordance with changes in the resistance value of the resistance means whereby the value of the condition being controlled is maintained within desired limits, and means operated by said device following deviation of the condition being controlled from its desired normal value additionally to position said device with respect to the resistance value of the resistance means for returning the value of the condition being controlled toward the desired normal value, said last mentioned means including mechanism which additionally positions said device, means for biasing said mechanism to a desired position and hydraulically operated means operated by said device for moving said mechanism out of the desired position but allowing the biasing means to move gradually said mechanism to the desired position for additionally positioning gradually said device.

11. In combination, an electrically operated device to be positioned in a plurality of positions for controlling the value of a condition, control electrical resistance means varied in accordance with changes in the value of the condition being controlled and having a desired resistance value corresponding to a desired normal value of the condition, means controlled by variations in the resistance value of the control resistance means and including follow-up means operated by the device for positioning said device in accordance with changes in the resistance value of the control resistance means whereby the value of the condition being controlled is maintained within desired limits, compensating electrical resistance means for additionally positioning said electrically operated device, and means including time delay means operated by said device following deviation of the condition being controlled from its desired normal value for adjusting the compensating resistance means additionally to position said device with respect to the resistance value of the control resistance means for returning the value of the condition being controlled toward the desired normal value, the rate of additional positioning of the device being controlled by the time delay means and being a function of the amount of deviation of the condition being controlled from the desired value.

12. In combination, an electrically operated device to be positioned in a plurality of positions for controlling the value of a condition, control electrical resistance means varied in accordance with changes in the value of the condition being controlled and having a desired resistance value corresponding to a desired normal value of the condition, means controlled by variations in the resistance value of the control resistance means and including follow-up means operated by the device for positioning said device in accordance with changes in the resistance value of the control resistance means whereby the value of the condition being controlled is maintained within desired limits, compensating electrical resistance means for additionally positioning said electrically operated device, and means operated by said device following deviation of the condition being controlled from its desired normal value for adjusting the compensating resistance means additionally to position said device with respect to the resistance value of the resistance means for returning the value of the condition being controlled toward the desired normal value, said last mentioned means including a spring biased hydraulic connection between the device and the compensating resistance means for causing the rate of additional positioning of the device to be a function of the amount of deviation of the condition being controlled from the desired value.

13. In combination, a device to be positioned in a plurality of positions to control the value of a condition, control electrical resistance means varied in accordance with changes in the value of the condition to be controlled and having a desired normal resistance value corresponding to a desired normal value of the condition, normally balanced electrical relay means in control of said device and connected to said control resistance means to be unbalanced thereby upon changes in the resistance value of the control resistance means, means operated by said device for rebalancing said relay means to position said device in accordance with changes in the resistance value of the control resistance means whereby the value of the condition to be controlled is maintained within certain limits, compensating electrical resistance means for also unbalancing said relay means additionally to position said device, and means including time delay means operated by said device following deviation of the condition to be controlled from the desired normal value for adjusting the compensating resistance means for returning the value of the condition to be controlled toward the desired normal value, the rate of additional positioning of the device being controlled by the time delay means and being a function of the amount of deviation of the condition being controlled from the desired value.

14. In combination, a device to be positioned in a plurality of positions to control the value of a condition, control electrical resistance means varied in accordance with changes in the value of the condition to be controlled and having a desired normal resistance value corresponding to a desired normal value of the condition, normally balanced electrical relay means in control of said device and connected to said control resistance means to be unbalanced thereby upon changes in the resistance value of the control resistance means, means operated by said device for rebalancing said relay means to position said device in accordance with changes in the resistance value of the control resistance means whereby the value of the condition to be controlled is maintained within certain limits, compensating electrical resistance means for also unbalancing said relay means additionally to position said device, and means operated by said device following deviation of the condition to be controlled from the desired normal value for adjusting the compensating resistance means for returning the value of the condition to be controlled toward the desired normal value, said last mentioned means including a spring biased hydraulic connection between the device and the compensating resistance means for causing the rate of additional positioning of the device to be a function of the amount of deviation of the condition to be controlled from the desired value.

DOUGLAS H. ANNIN.